United States Patent [19]

Sundberg

[11] Patent Number: 5,203,250
[45] Date of Patent: Apr. 20, 1993

[54] FLUID CYLINDER MECHANISM
[75] Inventor: John D. Sundberg, Beaver Dam, Wis.
[73] Assignee: Deere & Company, Moline, Ill.
[21] Appl. No.: 922,643
[22] Filed: Jul. 29, 1992

Related U.S. Application Data

[63] Continuation of Ser. No. 632,282, Dec. 21, 1990, abandoned.

[51] Int. Cl.$^5$ .......................... F15B 13/02; F01B 9/00; F16J 1/10
[52] U.S. Cl. ........................................... 91/51; 92/29; 92/129; 92/130 R
[58] Field of Search ............... 92/29, 129, 130 R, 134, 92/DIG. 4; 91/51, 47

[56] References Cited

U.S. PATENT DOCUMENTS

| | | | |
|---|---|---|---|
| 451,846 | 5/1891 | Bachman | 92/62 |
| 787,480 | 4/1905 | Tanner | 92/65 X |
| 1,994,835 | 3/1935 | Sanford et al. | 92/129 X |
| 2,649,842 | 8/1953 | Caldwell et al. | 92/DIG. 4 X |
| 3,118,349 | 1/1964 | Combs | 92/129 X |
| 3,448,662 | 6/1969 | Mueller | 92/62 X |
| 3,614,912 | 10/1971 | Nepp | 92/25 |
| 3,866,727 | 2/1975 | Myers | 92/143 X |
| 4,070,946 | 1/1978 | Sandvic et al. | 91/25 |
| 4,723,479 | 2/1988 | Gallentine | 92/29 X |
| 4,726,284 | 2/1988 | Green | |
| 4,747,257 | 5/1988 | Hutchison | |
| 4,896,489 | 1/1990 | Wykhuis | |
| 4,920,732 | 5/1990 | Lee et al. | 91/446 |
| 5,009,068 | 4/1991 | Clarke | 92/65 X |
| 5,165,322 | 11/1992 | Moody | 92/130 R X |

FOREIGN PATENT DOCUMENTS

| | | | |
|---|---|---|---|
| 388483 | 12/1988 | Austria | |
| 999277 | 10/1951 | France | 92/62 |
| 2203947 | 10/1973 | France | |
| 2512319 | 9/1981 | France | |
| 626806 | 7/1947 | United Kingdom | |
| 2132273 | 12/1983 | United Kingdom | |

Primary Examiner—Edward K. Look
Assistant Examiner—John Ryznic

[57] ABSTRACT

A fluid cylinder mechanism couplable to a vehicle and having a piston slidable within the cylinder, a rod couplable to an implement and shiftable within an opening in the piston, the rod being adapted to shift vertically within the piston a an implement rides over ground undulations, and an abutment mechanism coupled to the rod for abutment with the piston when the piston shifts upwardly due to selective forcing of fluid into the rod end of the cylinder by the operator to transfer the weight of the implement to the vehicle or to lift the implement for transport.

16 Claims, 2 Drawing Sheets

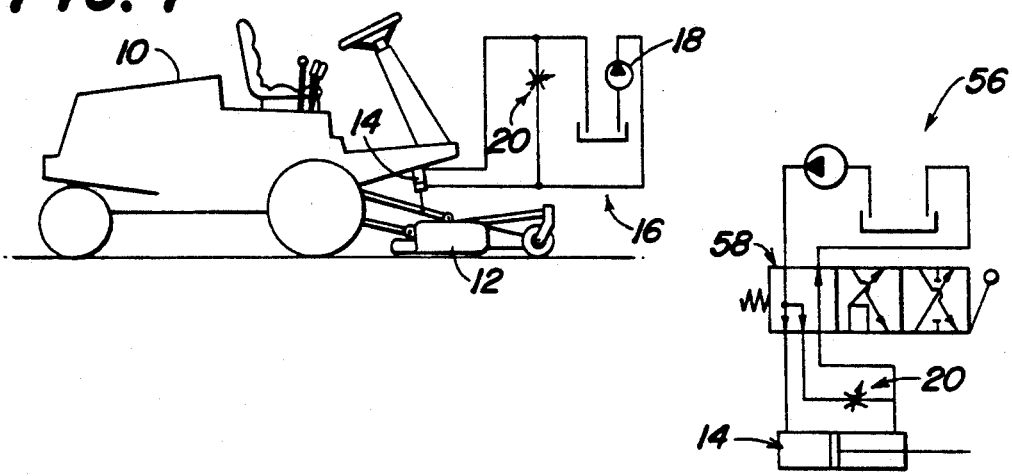
FIG. 1
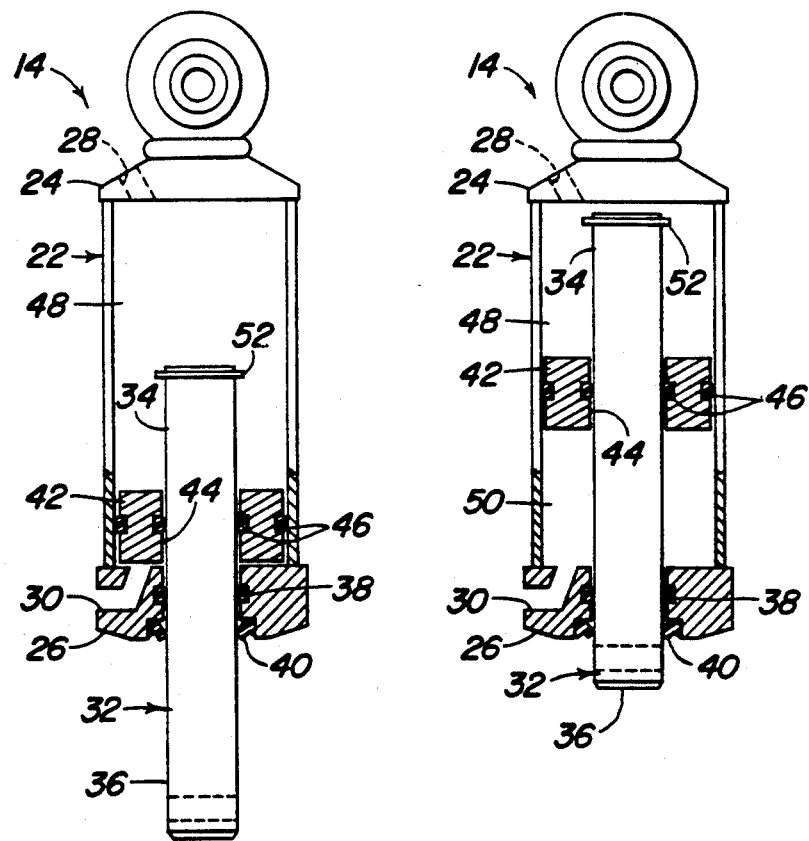
FIG. 8
FIG. 2   FIG. 3

FLUID CYLINDER MECHANISM

This is a continuation of application Ser. No. 07/632,282 filed Dec. 21, 1990, now abandoned.

BACKGROUND OF THE INVENTION

1. Field of the Invention

The invention relates to hydraulic cylinder mechanisms used for raising and lowering implements carried by powered vehicles.

2. Description of the Related Art

U.S. Pat. No. 4,920,732 illustrates a mowing vehicle having a mower deck coupled to a vehicle via a hydraulic cylinder assembly. Conventional cylinders have rods rigidly fixed to pistons within the cylinder, and can be actuated to selectively transfer the weight of the deck to the vehicle to enhance the vehicle's traction and stability during operation. These cylinders can also be actuated by the operators to lift the deck over curbs or other obstructions during transport.

During operation, the mower deck shown in U.S. Pat. No. 4,920,732 will roll over ground contours. The deck will rise up as it encounters a bump, and will therefore press upwardly on the rod to cause the piston to shift upwardly within the cylinder. Fluid will be drawn into the rod end of the cylinder in response to the piston shifting upwardly. The piston tends to shift upward rapidly, since the ground and deck press the rod and piston upwardly against the large weight of the vehicle. Fluid therefore enters the rod end of the cylinder quickly and does not undesirably slow the shifting of the piston.

Once the deck passes over the crest of a bump the front of the deck must tilt downwardly to remain in contact with the ground for continued mowing operations. To accomplish this, the weight of the deck acts to shift the piston downwardly within the cylinder. Fluid must be forced out of the rod end of the cylinder by the piston as it shifts downwardly. The small size of the opening in the cylinder and the pressure in the hydraulic circuit tend to resist the displacement of fluid from the cylinder. Since the weight of the deck, which is small compared to the weight of the vehicle, is the only force acting to shift the piston downwardly and force the fluid out of the cylinder, the downward shifting of the piston and deck thereattached is relatively slow. Therefore, once the deck has passed over the crest of a bump, the slow downward shifting of the deck may cause an area of vegetation to be left uncut by the mower.

Therefore, it would be desirable to provide a fluid cylinder assembly that can be selectively actuated for weight transferral or lifting of the implement, and that allows the implement to follow the contours of the ground. It would be desirable to provide such a cylinder with a mechanism that allows t he deck to rapidly shift downwardly to remain in contact with the ground after ground undulations have been encountered such that little or no areas of grass are left uncut. It would also be desirable for such a mechanism to be internally provided by the workings of the cylinder.

SUMMARY OF THE INVENTION

A fluid cylinder mechanism is provided for coupling a first structure or vehicle to a second structure or implement. A cylinder means is provided having a base end coupled to the vehicle, and a rod end opposite the base end. A piston means is slidably received by the cylinder means and defines a piston opening. A rod means is slidably received within the piston opening to allow the piston means to float on the rod means. The rod means is also received in the rod end of the cylinder. The rod means is coupled to the implement and is shiftable vertically within the piston means and rod end of the cylinder means in response to the implement encountering undulations in ground conditions. A hydraulic circuit is coupled with the cylinder means, and can be controlled for forcing additional fluid into a rod end chamber of the cylinder means to thereby force the piston means upwardly along the rod means and against a snap ring coupled to the end of the rod means. The snap ring, rod means, and implement are thereby lifted for transport over obstructions such as curbs. The hydraulic circuit can also be controlled for transferring a portion of the weight of the implement to the vehicle via the fluid cylinder mechanism for enhancing traction and stability during operation.

BRIEF DESCRIPTION OF THE DRAWINGS

FIG. 1 illustrates the present invention as used to couple an implement to a vehicle, and a schematic of a hydraulic circuit for controlling the fluid cylinder mechanism.

FIG. 2 illustrates the preferred embodiment of the present invention when used with a hydraulic circuit as shown schematically in FIG. 8, the fluid cylinder mechanism being shown in operation over level terrain.

FIG. 3 illustrates the preferred embodiment of the fluid cylinder mechanism when used with the hydraulic circuit depicted in FIG. 1 and as the implement encounters an upslope in ground conditions.

FIG. 8 schematically illustrates a hydraulic circuit that maintains a higher pressure in the base end chamber of the cylinder mechanism than the rod end chamber during normal operation.

DESCRIPTION OF THE PREFERRED EMBODIMENT

Figure 4:
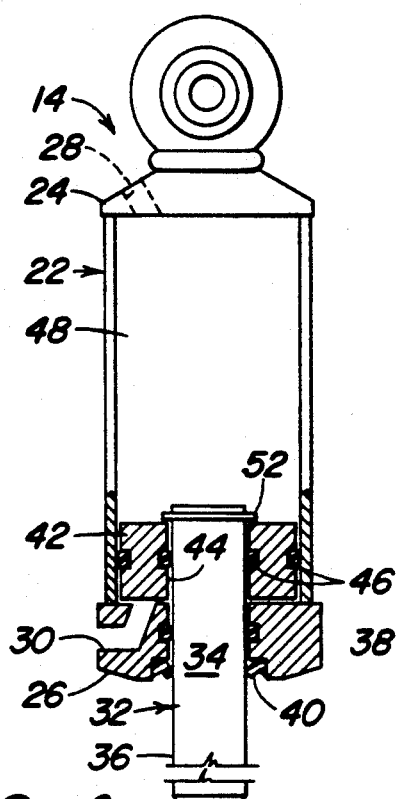
FIG. 4 shows the fluid cylinder mechanism as used with the hydraulic circuit shown in FIG. 1 when the implement encounters a downslope in ground conditions.

Referring now to FIG. 1, there is shown a vehicle 10 adapted for carrying an implement 12 such as a mower deck or snow blower. A cylinder mechanism 14 according to the preferred embodiment acts to couple the implement 12 to the vehicle 10, and allows the implement 12 to ride over undulations in ground conditions. The cylinder mechanism 14 is coupled to a hydraulic circuit 16 such as the one shown schematically in FIG. 1. A pump 18 is provided for directing pressurized fluid through the circuit 16. Other mechanisms, such as a hydraulic steering mechanism, may also be powered by the pump 18. A weight transfer valve 20 having a variable orifice is provided in the circuit 16 that can be selectively controlled to raise the implement 12 for transport over obstructions such as curbs. The hydraulic circuit 16 and valve 20 are also controllable by the operator for selectively transferring the weight of the implement 12 to the vehicle 10 during implement operation to thereby enhance the vehicle's operating traction and stability.

Referring now to FIGS. 2-6, there is shown the fluid cylinder mechanism 14 according to the preferred embodiment of the present invention for coupling an implement 12 to a vehicle 10. A cylinder means 22 having a base end 24 and a rod end 26 is pivotally coupled to the vehicle 10. A base end port 28 and a rod end port 30 are provided in the cylinder means 22, and each accommodates the flow of hydraulic fluid into and out of the cylinder means 22. A rod means 32 having first and second end portions 34, 36 is pivotally coupled to the implement 12 and is slidably received by the rod end 26 of the cylinder means 22. A seal 38 and wiper 40 are positioned between the rod means 32 and the cylinder means 22. The rod means 32 is also slidably received by a piston means 42 having a central opening 44, and is therefore capable of shifting relative to the piston means 42. Seals 46 are carried by the piston means 42 and are positioned between the piston means 42 and rod means 32, and between the piston means 42 and cylinder walls. The piston means 42 and cylinder means 22 define a pair of chambers 48, 50 that are filled with fluid during operation. On one side of the piston means 42 is a base end chamber 48, and on the opposite side is a rod end chamber 50. An abutment means or snap ring 52 is carried by the rod means 32 for abutting the piston means 42 as the piston means 42 shifts on the rod means 32 in response to fluid being selectively forced into the rod end chamber 50.

Figure 5:
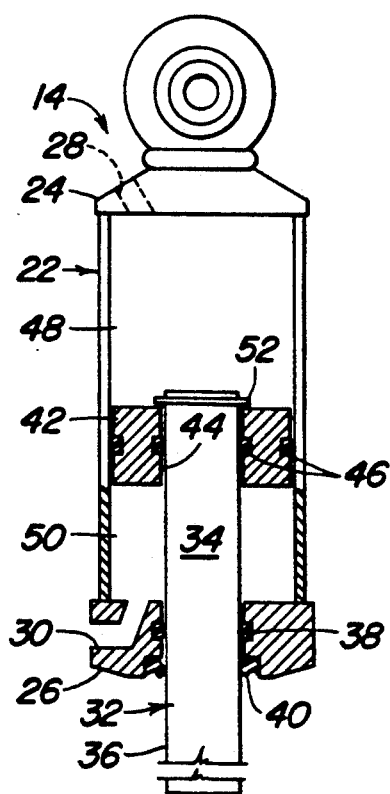
FIG. 5 shows the fluid cylinder mechanism as used with the hydraulic circuit depicted in FIG. 1 and with the implement operating on level ground.
Figure 6:
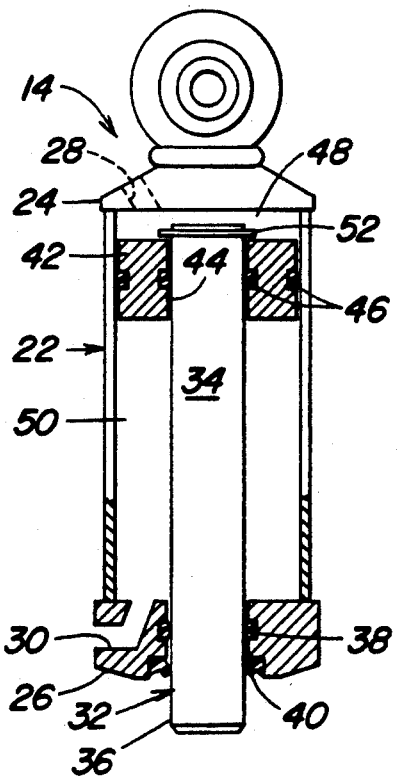
FIG. 6 shows the fluid cylinder mechanism when used with the hydraulic circuit depicted in FIG. 1 and with the variable orifice valve closed by the operator to thereby lift the implement for transport over an obstruction.

Next the operation of the preferred embodiment will be discussed. First, the weight transfer and lifting operation will be addressed. FIG. 5 is believed to illustrate the cylinder mechanism 14 in its neutral operating position. The snap ring 52 coupled to the rod means 32 is positioned as shown near the middle of the cylinder means 22 when the mower deck 12 is operating on level ground. The piston means 42 as shown is positioned against the snap ring 52 due to the fluid in the rod end chamber 50 being at a slightly higher pressure than the fluid in the base end chamber 48. This pressure differential is caused in part by the weight transfer valve 20, which causes the fluid flowing therethrough to experience a pressure drop of approximately 28 psi when the valve is fully opened. This 28 psi pressure drop causes the pressures upstream of the weight transfer valve 20 to be higher than the downstream pressures. Therefore, the fluid in the rod end chamber 50, which is upstream of the weight transfer valve 20, will normally be at a higher pressure than the fluid in the base end chamber 48, which is downstream of the weight transfer valve 20. This pressure differential causes the piston means 42 to be forced upwardly on the rod means 32 and toward the snap ring 52 during normal operation, however the pressure differential is not great enough to lift the implement 12.

To initiate the weight transfer or lift operation, the operator actuates the valve 20 to restrict the passage of fluid through the weight transfer valve 20, thereby forcing more fluid to pass through the rod end port 30 and enter the rod end chamber 50. The pressure in the rod end chamber 50 is thereby increased, which causes the piston means 42 to press upwardly on the snap ring 52. As the piston means 42 presses upwardly on the snap ring 52 a portion of the weight of the implement 12 is transferred to the vehicle 10 via the cylinder mechanism 14. Therefore, the operator can transfer a portion of the implement's weight to the vehicle 10 during operation for increasing the vehicle traction by manipulating the restriction in the valve 20.

To lift the implement 12 off the ground, the operator further restricts or closes the variable orifice of the weight transfer valve 20, which forces more fluid into the rod end chamber 50. The increased pressure in rod end chamber 50 causes the piston means 42 to raise the ring 52, the rod means 32 and implement 12 thereattached to the base end chamber 48. The implement 12 is thereby lifted for transport over obstacles such as curbs.

When the operator wishes to lower the implement 12 for operation, he opens the variable orifice of the weight transfer valve 20. The pressure in the rod end chamber 50 will therefore decrease, and the weight of the implement 12 will act on the rod means 32, snap ring 52 and piston means 42, causing them to move downwardly within the cylinder means 22. Fluid will be displaced from the rod end chamber 50 and into the hydraulic circuit 16 as the piston means 42 shifts toward the rod end 26 of the cylinder means 22. Fluid will be drawn in to the base end chamber 48 from the circuit 16 as the piston means 42 shifts downwardly. The implement 12 will eventually come to rest on the ground again, and the cylinder mechanism 14 will then be in the configuration as shown in FIG. 5. At this point the rod means 32 will stop traveling downwardly, since the implement 12 has come to rest on the ground. The piston means 42 will also stop traveling downwardly, and will remain in abutment with the snap ring 52 as shown in FIG. 5 due to the pressure in the rod end chamber 50 being at a higher pressure than the base end chamber 48.

Next, the operation of the preferred embodiment will be described as the implement 12 is being utilized on undulating terrain with the weight transfer and lift mechanisms unactuated. FIG. 5 illustrates one configuration of the cylinder means 22, piston means 42 and rod means 32 when the implement 12 is operating on level ground. When the implement 12 encounters a rise in the surface of the ground, the implement 12 will shift upwardly to ride over the bump. This will cause the rod means 32 coupled to the implement 12 to shift upwardly within the cylinder means 22 to a position similar to that shown in FIG. 3. Since the rod means 32 is slidably received within the opening 44 in the piston means 42, the piston means 42 need not necessarily shift upwardly with the rod means 32. As the rod means 32 shifts upwardly into the base end chamber 48, the fluid pressure in the base end chamber 48 will increase. This increase in pressure can cause fluid to exit the base end chamber 48 through the base end port 28, and can cause the piston means 42 to shift further downwardly on the rod means 32 within the cylinder means 22. Since the rod means 32 is driven upwardly within the cylinder means 22 against the relatively large weight of the vehicle 10, the rod means 32 can shift upward relatively rapidly.

As the implement 12 rides over the crest of the bump, the implement 12 will tend to fall to the ground again under its own weight. The rod means 32 therefore shifts downwardly from the position shown in FIG. 3 to the position shown in FIG. 5. As the rod shifts downwardly from the position shown in FIG. 3, the volume previously occupied by the rod means 32 within the base end chamber 48 must be filled. This volume is filled by fluid flowing into the base end chamber 48, or by the piston means 42 shifting upwardly on the rod means 32. The weight of the implement 12 is small compared to the vehicle 10, and therefore the force acting to draw fluid into the base end chamber 48 as the implement 12 shifts downwardly is relatively small. However, the amount of fluid that must be drawn into the base end chamber 48 is believed to be less than the amount displaced by prior art mechanisms during similar downward shifting of the implement 12. The amount of fluid displaced is smaller because the rod means 32 is allowed to shift within the piston means 42 as the implement 12 drops. The cross sectional area of the rod means 32 as it shifts within the base end chamber 48 is less than the cross sectional area of prior art pistons and rods rigidly coupled together, and therefore the volume of fluid that is required to be displaced within the cylinder is decreased. Because the amount of fluid drawn in is less than if the piston means 42 were fixed to the rod means 32, the downward shifting of the implement 12 as it passes over the crest of the bump will occur more rapidly. Also, the shifting of the piston means 42 within the cylinder means 22 to fill the volume within the base end chamber 48 vacated by the shifting rod means 32 tends to decrease the amount of fluid required to be displaced. Therefore, the implement 12 will tilt downwardly toward the ground under its own weight more rapidly to continue operation.

The preferred embodiment shown in FIG. 1 is coupled between a vehicle 10 and a mower deck implement 12. As the deck 12 passes over a bump's crest, the deck 12 will tilt downwardly more quickly under its own weight since a smaller amount of fluid is required to be displaced. Therefore, little or no area of grass is left uncut when the deck 12 encounters a downslope.

When the implement 12 is operating on level ground and then encounters a dip, the implement 12 must shift downwardly under its own weight to stay in contact with the ground for optimum performance. When this occurs, the rod means 32 and piston means 42 shift downwardly from the neutral position shown in FIG. 5 to the position shown in FIG. 4. As the rod means 32 and piston means 42 shift downwardly within the cylinder means 22, fluid will be forced out of the rod end chamber 50 and into the hydraulic circuit 16. At the same time, fluid from the circuit 16 will flow into the base end chamber 48 to occupy the space vacated by the rod means 32 and piston means 42.

The preferred embodiment of the present invention is described above as used with a hydraulic circuit 16 that causes the fluid in the rod end chamber 50 to be at a pressure slightly higher than the fluid in the base end chamber 48 during normal operating conditions. Therefore the piston means 42 utilized in the above described environment will normally be positioned against the snap ring 52 when operating on level ground. However, the cylinder mechanism 14 according to the present invention could also be used with a hydraulic circuit, such as the one shown in FIG. 8, that creates a slightly higher pressure in the base end chamber 48 than the rod end chamber 50 during normal operation. This would cause the piston means 42 to shift downwardly with respect to the rod means 32 and thereby be positioned adjacent the rod end 26 of the cylinder means 22 during operation on level ground, as shown in FIG. 2. A space or clearance would therefore exist between the snap ring 52 and the piston means 42. When the implement 12 would encounter a depression in the ground conditions, the rod means 32 and snap ring 52 would then shift downwardly due to the weight of the implement 12 without abutting the piston means 42 or shifting the piston means 42 downwardly. Therefore, it is believed that less fluid would need to be displaced, and the downward shifting of the implement 12 would occur more rapidly.

The alternate hydraulic circuit 56 shown schematically in FIG. 8 depicts a three position valve 58. The valve is configured in the first position during normal operation of the implement. The first position allows the piston means 42 to float on the rod means 32, and creates a slightly higher pressure in the base end chamber 48 than the rod end chamber 50, since the rod end chamber 50 is downstream of the weight transfer valve 20. The second position of the valve 58 is utilized when the weight transfer valve 20 is actuated for transferring the weight of the implement 12 to the vehicle 10. The third position is utilized when the implement 12 is being raised for transport.

The preferred embodiment illustrated in the attached drawings shows the cylinder mechanism 14 having the base end portion 24 of the cylinder means 22 coupled to the vehicle 10, and the rod means 32 coupled to the implement or deck 12. In this configuration the rod means 32 is positioned beneath the cylinder means 22, thereby generally preventing debris from accumulating in the vicinity where the rod means 32 passes through the base end 24 of the cylinder means 22. The rod means 32 therefore remains cleaner, and fewer contaminants are introduced into the cylinder chambers 48, 50. However, it is apparent that the cylinder mechanism 14 according to the present invention could also be employed by coupling the base end portion 24 of the cylinder means 22 to the implement 12, and coupling the rod 32 to the vehicle 10.

Figure 7:
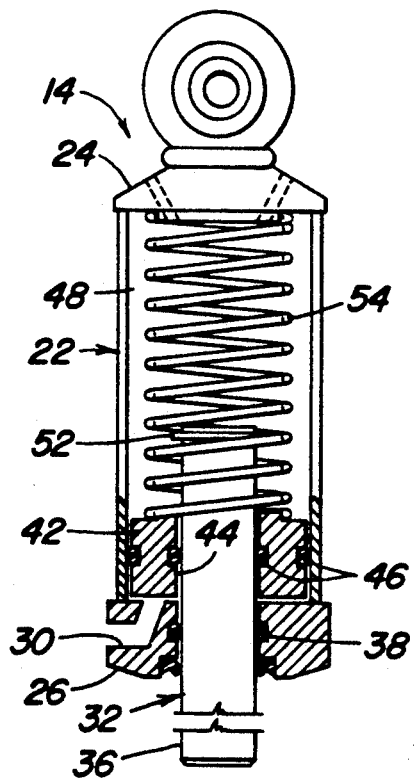
FIG. 7 shows the fluid cylinder mechanism having a spring for biasing the piston means toward the rod end of the cylinder means, the fluid cylinder mechanism being shown in operation on level ground.

Referring now to FIG. 7, there is shown an alternative embodiment of the present invention utilizing a single acting cylinder. The base end chamber 48 of the alternative embodiment shown in FIG. 7 does not contain hydraulic fluid, but rather is provided with a biasing means or spring 54 for biasing the piston means 42 to shift toward the rod end 26 of the cylinder means 22. The base end port 28 allows the passage of air into and out of the base end chamber 48, and is sized large enough that the flow of air is not significantly restricted as the rod means 32 shifts upwardly due to ground undulations. However, the rod end chamber 50 is coupled during operation to a hydraulic circuit as shown in U.S. Pat. No. 4,920,320, and allows fluid to be selectively forced into the cylinder means 22 when the operator actuates a control to restrict the variable orifice. When the orifice is restricted, fluid is forced into the rod end chamber 50 to shift the piston means 42 upward against the biasing force of the spring 54. The piston means 42 can thus be forced upwardly against the snap ring 52 for transferring the weight of the implement 12 to the vehicle 10, or can be shifted further upwardly to lift the implement 12. The spring 54 of the alternative embodiment acts to bias the piston means 42 toward the rod end 26 of the cylinder means 22, and thereby create a space or clearance between the snap ring 52 and piston means 42 during operation on level ground, such that the rod means 32 can shift either up or down as bumps or dips are encountered without abutting the piston means 42. In this way less fluid is displaced and the shifting of the implement 12 is quickened.

I claim:

1. A fluid cylinder mechanism couplable between a first and second structures, comprising:

a cylinder means having a base end couplable to the first structure, and having a rod end opposite the base end;

a piston means slidably received within said cylinder means, said piston means having an opening defined therein, a base end chamber being formed between the piston means and the base end of the cylinder means, and a rod end chamber being formed between the piston means and the rod end of the cylinder means;

a rod means slidably received by the rod end of the cylinder means and the piston means opening, said rod end of the cylinder means and said piston means being positioned between first and second end portions of the rod means, said second end portion being operatively couplable to the second structure, and said rod means being shiftable along its longitudinal axis within the rod end of the cylinder means and within the piston means opening as the first and second structures shift relative to each other;

said piston means being shaftable along the rod means to a position substantially adjacent the rod end of the cylinder means regardless of the position of the rod means within the cylinder means;

a fluid circuit means is communication with the rod end chamber for selectively forcing fluid into the rod end chamber to selectively urge the piston means toward the base end, said fluid circuit means also being in communication with the base end chamber;

abutment means formed between the piston means and first end portion of the rod means for urging the rod means toward the base end as the piston is urged toward the base end, thereby urging the first and second structures toward each other, and said first end portion of the rod means and the abutment means each have effective diameter's substantially smaller than the diameter of the piston such that the first end portion of the rod means and abutment means displace less fluid as the rod means shifts relative to the piston means than the piston means and rod means displace when shifting together, restrictor means coupled with the fluid circuit means downstream of the base end chamber and upstream of the rod end chamber during normal operation for maintaining a slightly higher fluid pressure in the base end chamber than the rod end chamber for thereby biasing the piston means to the rod end of the cylinder means during normal operation.

2. The invention of claim 1, wherein the abutment means comprises a snap ring carried by the first end portion of the rod means.

3. The invention of claim 1, wherein the restrictor means is a variable orifice weight transfer valve.

4. A fluid cylinder mechanism as used for coupling an implement to a vehicle, comprising:

a cylinder means having a base end couplable to the vehicle, and having a rod end opposite the base end;

a piston means slidably received within said cylinder means, said piston means having an opening defined therein, a base end chamber being formed between the piston means and the base end of the cylinder means, and a rod end chamber being formed between the piston means and the rod end of the cylinder means;

a rod means slidably received by the rod end of the cylinder means and the piston means opening, said rod end of the cylinder means and said piston means being positioned between first and second end portions of the rod means, said second end portion being operatively couplable to the implement, said rod means being shiftable along its longitudinal axis within the rod end of the cylinder means and within the piston means opening as the implement shifts vertically relative to the vehicle to accommodate variations in ground contour;

said piston means being shiftable along the rod means to a position substantially adjacent the rod end of the cylinder means regardless of the position of the rod means within the cylinder means, a fluid circuit means in communication with the rod end chamber for selectively forcing fluid into said rod end chamber to selectively urge the piston means toward the base end, said fluid circuit means also being in communication with the base end chamber, abutment means formed between the piston means and first end portion of the rod means for urging the rod means toward the base end as the piston is urged toward the base end, thereby urging the implement toward the vehicle said abutment means and first portion of the rod means having a smaller effective diameter than the piston means such that a smaller amount of fluid is displaced by the rod means shifting relative to the piston means as the implement rides up and down over ground contours than the piston means and rod means displace when shifting together, and biasing means for biasing the piston means to the rod end of the cylinder means during an operating mode of the implement ,said biasing means acting to maintain a space between the abutment means and the piston means for generally allowing the abutment means to shift within the cylinder means without contacting the piston means when the rod means shifts within the cylinder means as variations in ground contours are encountered by the implement, wherein the biasing means further comprises a restrictor means coupled with the fluid circuit means downstream of the base end chamber and upstream of the rod end chamber during normal implement operation for creating a slightly higher fluid pressure in the base end chamber than the rod end chamber.

5. The invention of claim 4, wherein the biasing means biases the piston means to a position substantially adjacent the rod end of the cylinder means.

6. The invention of claim 4, wherein the number of piston means carried within the cylinder means equals one.

7. The invention of claim 4, wherein the restrictor means is a variable orifice weight transfer valve.

8. A hydraulic piston means mountable between a mobile vehicle and an implement swingable mounted from said vehicle, said hydraulic piston means comprising:

cylinder means having an inside diameter, including a base end having a chamber therein, a rod end having a chamber therein and an opening therethrough;

rod means slidably mounted in and shiftable through the opening in the rod end of the cylinder means, the portion of the rod means carried within the cylinder means having an abutment means thereon; and piston means carried in the cylinder means and on the rod means, said piston means being slidable on and within the rod means as said piston means shifts within the chambers of the cylinder means, said piston means being shiftable along the rod means to a position substantially adjacent the rod end of the cylinder means regardless of the position of the rod means within the cylinder, and being abutable against the abutment means as said piston shifts toward the base end of the cylinder means, a fluid source in communication with the rod end chamber for selectively forcing fluid into said rod end chamber to selectively urge the piston means toward the base end, said piston being abutable against the abutment means as said piston shifts toward the base end of the cylinder means, said fluid source also being in communication wit the base end chamber, said first end portion of the rod means and the abutment means each having effective diameters substantially smaller than the inside diameter of the cylinder means such that a relatively small amount of fluid is displaced as the rod means shifts relative to the piston, and biasing means for biasing the piston means to the rod end of the cylinder means during an operating mode of the implement said biasing means acting to maintain a space between the abutment means and the piston means for generally allowing the abutment means to shift within the cylinder means without contacting the piston means when the rod means shifts within the cylinder means as variations in ground contours are encountered by the implement, wherein the biasing means further comprises a restrictor means coupled with the fluid circuit means downstream of the base end chamber and upstream of the rod end chamber during normal implement operation for creating a slightly higher fluid pressure in the base end chamber than in the rod chamber.

9. The invention of claim 8, wherein the restrictor means is a variable orifice weight transfer valve.

10. A fluid cylinder mechanism for coupling an implement with a vehicle, comprising:

a cylinder means having a base end couplable to the vehicle, and having a rod end opposite the base end;

a piston means slidably received within said cylinder means, said piston means having an opening defined therein, a base end chamber being formed between the piston means and the base end of the cylinder means, and a rod end chamber being formed between the piston means and the rod end of the cylinder means;

a rod means slidably received by the rod end of the cylinder means and the piston means opening, said rod end of the cylinder means and said piston means being positioned between first and second end portions of the rod means, said second end portion being operatively couplable to the implement, and said rod means being shiftable along its longitudinal axis within the rod end of the cylinder means and within the piston means opening as the implement rides up and down across ground undulations;

said piston means being shiftable along the rod means to a position substantially adjacent the rod end of the cylinder means regardless of the position of the rod means within the cylinder means;

a fluid source in communication with the rod end chamber for selectively forcing fluid into said rod end chamber to selectively urge the piston means toward the base end;

abutment means formed between the piston means and first end portion of the rod means for urging the rod means toward the base end as the piston is urged by the fluid source toward the base end, such that the implement is selectively urged toward the vehicle as to a transport position; and said first end of the rod means having an effective diameter substantially smaller than the diameter of the piston, such that a smaller amount of fluid is displaced as the rod shifts relative to the piston when the implement rides up and down across a ground undulation than the amount of fluid displaced when the piston and rod and being shifted together by the fluid source in communication with the rod end chamber, and said fluid source is also in communication with the base end chamber and includes a restrictor means downstream of the base end chamber and upstream of the rod end chamber for maintaining a slightly higher fluid pressure in the base end chamber than the rod end chamber to bias the piston means to be positioned substantially adjacent the rod end of the cylinder means during normal implement operation, said piston means thereby being spaced form the abutment means for allowing the rod means and abutment means to shift toward the rod end of the cylinder without contacting the piston means as the implement encounters variations in ground contours.

11. The invention of claim 10, wherein the restrictor means is a variable orifice weight transfer valve.

12. A fluid cylinder mechanism as used for coupling an implement to a vehicle, comprising:

a cylinder means having a base end couplable to the vehicle, and having a rod end opposite the base end;

a piston means slidably received within said cylinder means, said piston means having an opening defined therein, a base end chamber being formed between the piston means and the base end of the cylinder means, and a rod end chamber being formed between the piston means and the rod end of the cylinder means;

a rod means slidably received by the rod end of the cylinder means and the piston means opening, said rod end of the cylinder means and said piston means being positioned between first and second end portions of the rod means, said second end portion being operatively couplable to the implement, said rod means being shiftable along its longitudinal axis within the rod end of the cylinder means and within the piston means opening as the implement shifts vertically relative to the vehicle to accommodate variations in ground contour;

said piston means being shiftable along the rod means to a position substantially adjacent the rod end of the cylinder means regardless of the position of the rod means within the cylinder means, a fluid source in communication with the rod end chamber for selectively forcing fluid into said rod end chamber to selectively urge the piston means toward the base end, and abutment means formed between the piston means and first end portion of the rod means for urging the rod means toward the base end as the piston is urged toward the base end, thereby urging the implement toward the vehicle, and a spring in abutment with the piston means for biasing the piston means to a position substantially adjacent the rod end of the cylinder means.

13. A fluid cylinder mechanism as used for coupling an implement to a vehicle, comprising:

a cylinder means having a base end couplable to the vehicle, and having a rod end opposite the base end;

a piston means slidably received within said cylinder means, said piston means having an opening defined therein, a base end chamber being formed between the piston means and the base end of the cylinder means, and a rod end chamber being formed between the piston means and the rod end of the cylinder means;

a rod means slidably received by the rod end of the cylinder means and the piston means opening, said rod end of the cylinder means and said piston means being positioned between first and second end portions of the rod means, said second end portion being operatively couplable to the implement, said rod means being shiftable along its longitudinal axis within the rod end of the cylinder means and within the piston means opening as the implement shifts vertically relative to the vehicle to accommodate variations in ground contour;

said piston means being shiftable along the rod means to a position substantially adjacent the rod end of the cylinder means regardless of the position of the rod means within the cylinder means, a fluid source in communication with the rod end chamber for selectively forcing fluid into said rod end chamber to selectively urge the piston means toward the base end, abutment means formed between the piston means and first end portion of the rod means for urging the rod means toward the base end as the piston is urged toward the base end, thereby urging the implement toward the vehicle, and a compression spring carried within the base chamber and in abutment with the piston means for biasing the piston means to a position substantially adjacent the rod end of the cylinder means.

14. A hydraulic piston means mountable between a mobile vehicle and an implement swingable mounted from said vehicle, said hydraulic piston means comprising:

cylinder means including
a base end having a chamber therein,
a rod end having a chamber therein and an opening therethrough;

rod means slidably mounted in and shiftable through the opening in the rod end of the cylinder means,
the portion of the rod means carried within the cylinder means having an abutment means thereon; and piston means carried in the cylinder means and on the rod means, said piston means being slidable on and with the rod means as said piston means shifts within the chambers of the cylinder means, said piston means being shiftable along the rod means to a position substantially adjacent the rod end of the cylinder means regardless of the position of the rod means within the cylinder, and being abutable against the abutment means as said piston shifts toward the base end of the cylinder means, a fluid source in communication with the rod end chamber for selectively forcing fluid into said rod end chamber to selectively urge the piston means toward the base end, said piston being abutable against the abutment means as said piston shifts toward the base end of the cylinder means, a spring abutable with the piston means for biasing the piston means toward the rod end of the cylinder means.

15. The invention of claim 10, wherein the number of piston means carried within the cylinder means equals one.

16. A hydraulic piston means mountable between a mobile vehicle and an implement swingably mounted from said vehicle, said hydraulic piston means comprising:

cylinder means including
a base end having a chamber therein,
a rod end having a chamber therein and an opening therethrough;

rod means slidably mounted in and shiftable through the opening in the rod end of the cylinder means,
the portion of the rod means carried within the cylinder means having an abutment means thereon; and piston means carried in the cylinder means and on the rod means, said piston means being slidable on and with the rod means as said piston means shifts within the chambers of the cylinder means, said piston means being shiftable along the rod means to a position substantially adjacent the rod end of the cylinder means regardless of the position of the rod means within the cylinder, and being abutable against the abutment means as said piston shifts toward the base end of the cylinder means, a fluid source in communication with the rod end chamber for selectively forcing fluid into said rod end chamber to selectively urge the piston means toward the base end, said piston being abutable against the abutment means as said piston shifts toward the base end of the cylinder means, a compression spring carried within the base end chamber and in abutment with the piston means for biasing the piston means toward the rod end of the cylinder means to be spaced from the abutment means for allowing the rod means and abutment means to shift toward the rod end of the cylinder without contacting the piston means.

* * * * *

UNITED STATES PATENT AND TRADEMARK OFFICE
CERTIFICATE OF CORRECTION

PATENT NO. : 5,203,250
DATED : April 20, 1993
INVENTOR(S) : John D. Sundberg

It is certified that error appears in the above-indentified patent and that said Letters Patent is hereby corrected as shown below:

Claim 1, column 7, line 27, delete 'shaftable" and insert therefore --shiftable--; line 31, delete "is" and insert therefore --in--; line 32, delete "the" and insert therefore--said--.

Claim 8, column 8, line 64, delete "swingable" and insert therefore --swingably--; column 9, line 25, delete "wit" and isnert therefore --with--; line 48, after "rod" insert --end--.

Claim 10, column 10, line 27, delete "and" and insert therefore--are--; line 38, delete "form" and insert therefore --from--.

Claim 14, column 11, line 60, delete "swingable" and insert therefore --swingably--.

Signed and Sealed this

Fifth Day of April, 1994

Attest:

BRUCE LEHMAN

Attesting Officer   Commissioner of Patents and Trademarks